Feb. 27, 1951

H. A. SHABAKER 2,543,069

ART OF PREPARING GEL

Filed Dec. 21, 1946

INVENTOR.
H. A. Shabaker
BY
Gordon A. Kessler
ATTORNEY.

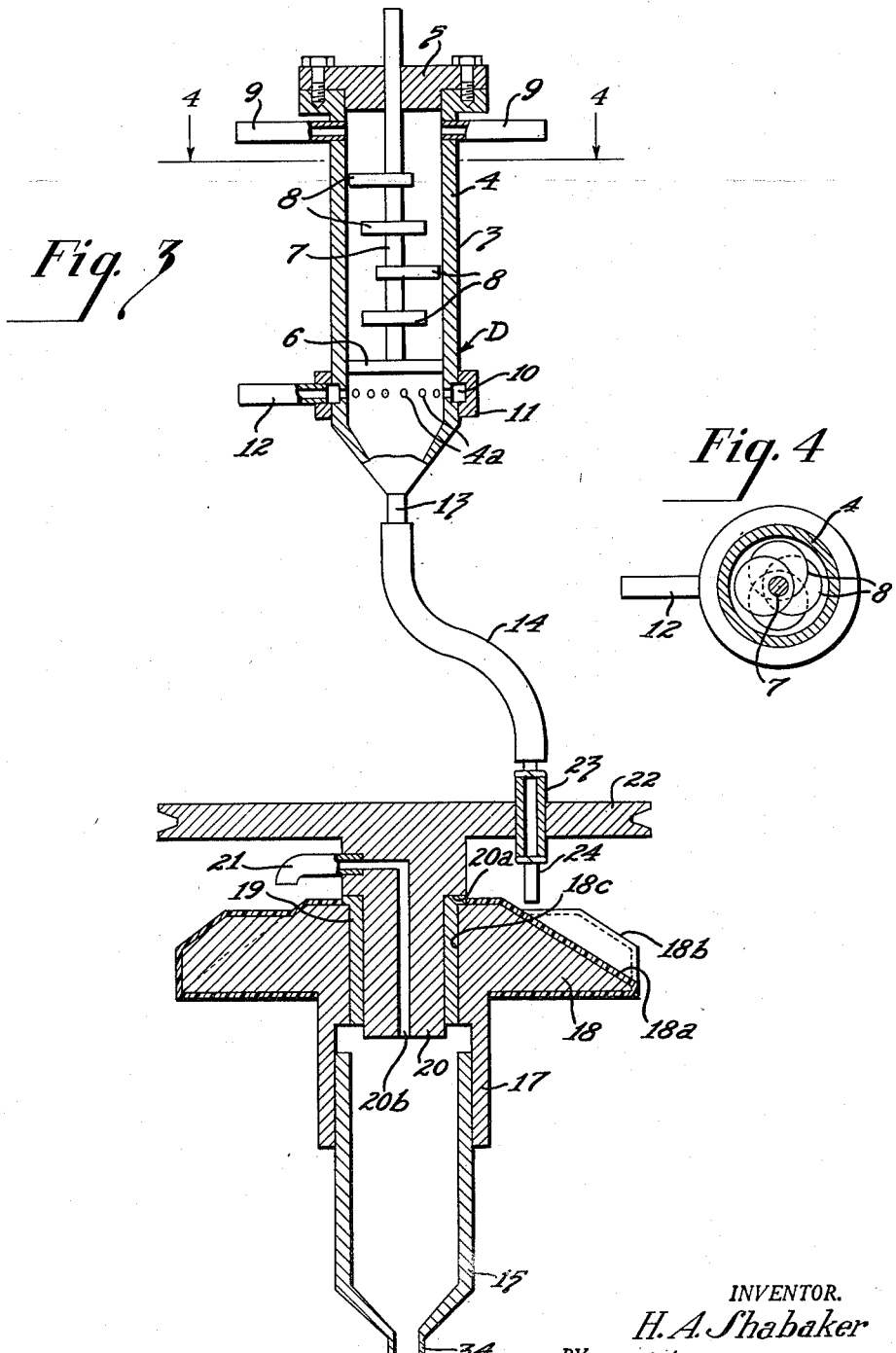

Feb. 27, 1951  H. A. SHABAKER  2,543,069
ART OF PREPARING GEL

Filed Dec. 21, 1946  3 Sheets-Sheet 3

INVENTOR.
H. A. Shabaker
BY
Gordon A. Kessler
ATTORNEY.

Patented Feb. 27, 1951

2,543,069

UNITED STATES PATENT OFFICE 2,543,069

ART OF PREPARING GEL

Hubert A. Shabaker, Media, Pa., assignor to Houdry Process Corporation, Wilmington, Del., a corporation of Delaware Application December 21, 1946, Serial No. 717,653

1 Claim. (Cl. 252—317)

My invention relates to the art of producing pieces of gel suitable for use in conducting catalytic operations or otherwise as may be desirable.

My invention relates particularly to the preparation of synthetic gels as individual beads having catalytic properties such, for example, as are suitable for effecting desired conversions of hydrocarbons.

In accordance with my invention, drops of a gel-forming liquid or sol are caused to float on a supporting liquid which is immiscible therewith until the drops of gel-forming liquid have set as pieces of gel, after which they are separated in suitable manner from the upper surface of said supporting liquid. The aforesaid drops of gel-forming liquid may be individually formed and thereafter engaged with the supporting liquid so as to float thereon or, alternatively, there may be engaged with the supporting liquid a stream of drop-forming liquid adapted thereafter to break up into drops which float on the surface of said supporting liquid for the purpose stated.

My invention relates further to a process of preparing pieces of gel which are formed after drops of gel-forming liquid in any suitable manner, either floating, suspended or otherwise, are associated with a liquid immiscible therewith, the liquid last named being maintained under conditions which, in part at least, cause said drops of gel-forming liquid to set to gel.

Various other objects, advantages and features of my invention will become apparent from the following detailed description.

My invention resides in the art of preparing gel, the method steps and arrangements of the character hereinafter described and claimed.

This application is a continuation in part of my application Serial No. 581,682, filed March 8, 1945.

For an understanding of my invention and for an illustration of one form of apparatus with which it may be practiced, reference is to be had to the accompanying drawings, in which:

Fig. 3 is an enlarged sectional view illustrating apparatus for forming drops of gel-forming liquid;

Fig. 4 is a transverse sectional view taken on the line 4—4 of Fig. 3;

Figure 1:
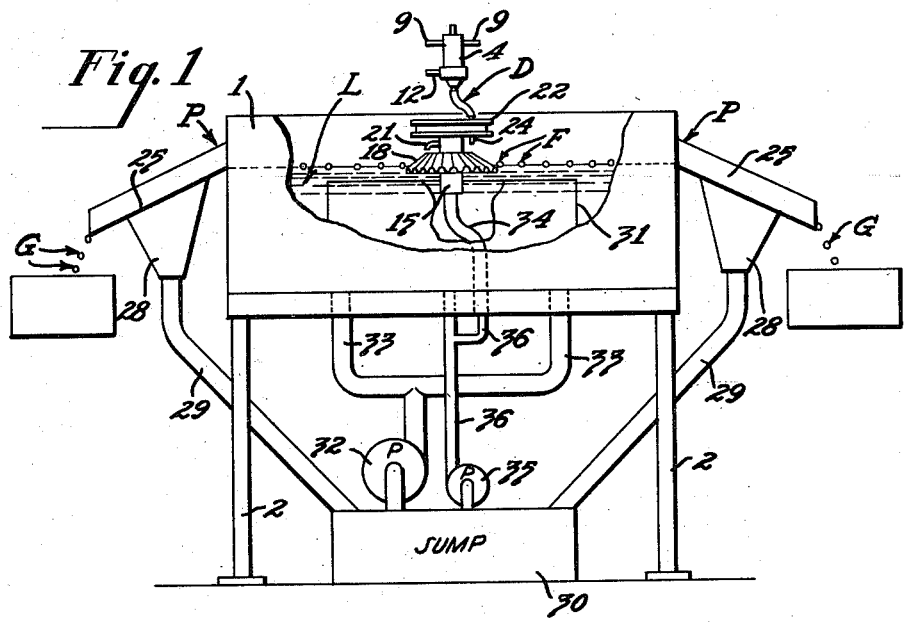
Fig. 1 is an elevational view, partly broken away, showing apparatus constructed to effect the process of my invention.

Referring to Fig. 1, I have shown a tank or receptacle 1 adapted to be supported in any suitable manner, as by a frame 2.

The tank 1 is adapted to contain a suitable supporting liquid L utilizable as hereinafter described. In the form of the invention herein shown, a device or mechanism D is associated with the tank 1 to produce drops F of gel-forming liquid or a sol which float on the upper surface of the liquid L while they set to gel. Thereafter, in suitable manner, for example, as hereinafter described, the floating drops of gel are disengaged from the upper surface of the liquid L and subjected to further processing as desired.

As shown particularly in Fig. 3, the device D comprises a mixer 3 for preparing a solution of material which will set to gel while supported by the liquid L in the tank 1. The mixer 3 comprises a suitably supported casing 4 having a cap 5 secured to and closing the upper end thereof. A rod or member 6 is disposed transversely within the lower end portion of the casing 4 and is secured in fixed position to the interior surface thereof in any suitable manner.

The rod 6 and the aforesaid cap 5 rotatably support a vertical shaft 7 adapted, during operation of the mixer, to be rotated in any suitable manner. A plurality of circular mixing plates 8 are fixed in spaced relation to the shaft 7, the arrangement being such that the plates 8 are eccentrically disposed in offset relation with respect to said shaft 7 as indicated particularly in Fig. 4. As herein illustrated, a plurality of inlet pipes 9 communicate with the casing 4 at the upper end thereof, these pipes 9 being utilizable as hereinafter described. In the form of the invention herein shown, the casing 4 comprises a lower horizontal row of inlet passages 4a communicating with an annular passage 10 defined in part by a ring 11 secured to the periphery of said casing 4. A pipe 12, connected to the ring 11, communicates with the aforesaid passage 10 and, hence, with the interior of the casing 4 by way of the inlet passages 4a. The lower conical end of the casing 4 terminates in a pipe 13 having connected thereto the upper end of a flexible tube 14 utilizable as hereinafter described. Alternatively, if desired, the shaft 7 may remain stationary during operation of the mixer and, if so, the baffling effect of the plates 8 serves adequately for mixing purposes.

Figure 5:
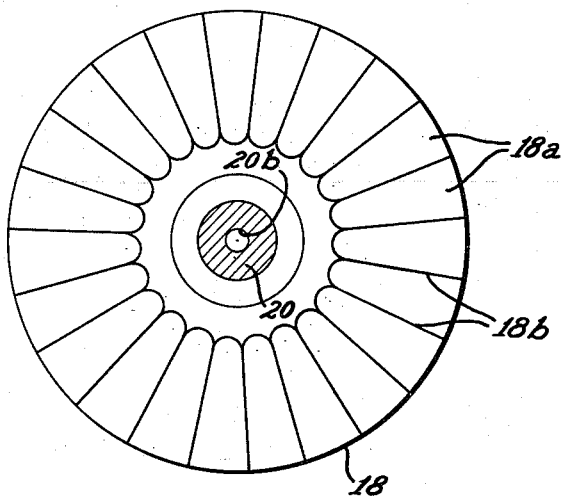
Figs. 5 and 6 are plan and elevational views respectively showing a part of the drop-forming apparatus.
Figure 6:
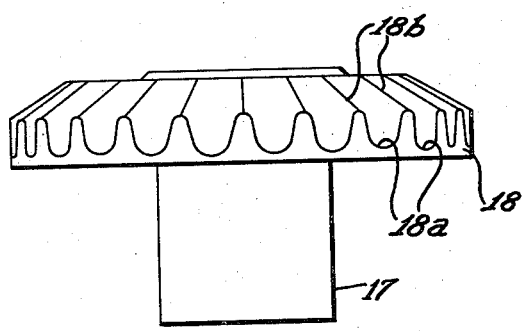
Figure 7:
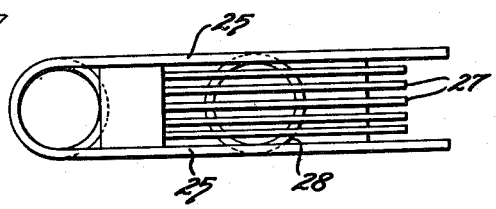
Fig. 7 is a plan view showing one of the outlet ports of the apparatus shown in Fig. 1.

Referring to Figs. 1 and 3, a tubular support 15 is suitably anchored interiorly of the tank 1 in the manner hereinafter described in order to hold it in a vertical position. Threaded or otherwise suitably secured to the upper, open end portion of the support 15 is a tubular member 17 which may be formed integrally with a circular disk or plate 18. As shown particularly in Figs. 5 and 6, the disk 18 comprises a plurality of uniformly spaced radial grooves or flutes 18a having duplicate configuration and sloping downwardly. As indicated, the dividing wall 18b between each pair of adjacent grooves 18a may have a relatively sharp upper edge. By reason of the fact that the solution from the device D is aqueous in character, it is desirable for the disk 18 and its grooves 18a to exhibit an exterior surface of water repellent material and, to this end, the disk 18 may be coated with hard wax, resin, a water-repellent synthetic resin or the like. Such a coating prevents build-up of gel on the surface of said disk 18.

The disk 18 comprises a central passage 18c which may receive a fixed sleeve or bushing 19 defining a vertical passage which is circular in horizontal cross-section. A stub shaft 20 is freely received in the passage of said sleeve 19 and, as indicated at 20a, the shaft may comprise a flange which seats on the upper surface of the sleeve 19. The shaft 20 comprises a passage 20b which communicates with a nozzle 21 carried thereby and having its downwardly directed outlet port disposed vertically above the disk 18 inwardly of the periphery thereof. A pulley 22, or equivalent, may be formed integrally with the upper surface of the shaft 20 and, during operation of the mixer, this pulley is rotated in any suitable manner.

As shown in Fig. 3, the pulley 22, adjacent the periphery thereof, carries a vertical sleeve or bushing 23 in which a conduit or tube 24 is supported for rotatable movement. The lower end of the hereinbefore described tube 14 is connected to the upper end of the conduit 24.

Figure 2:
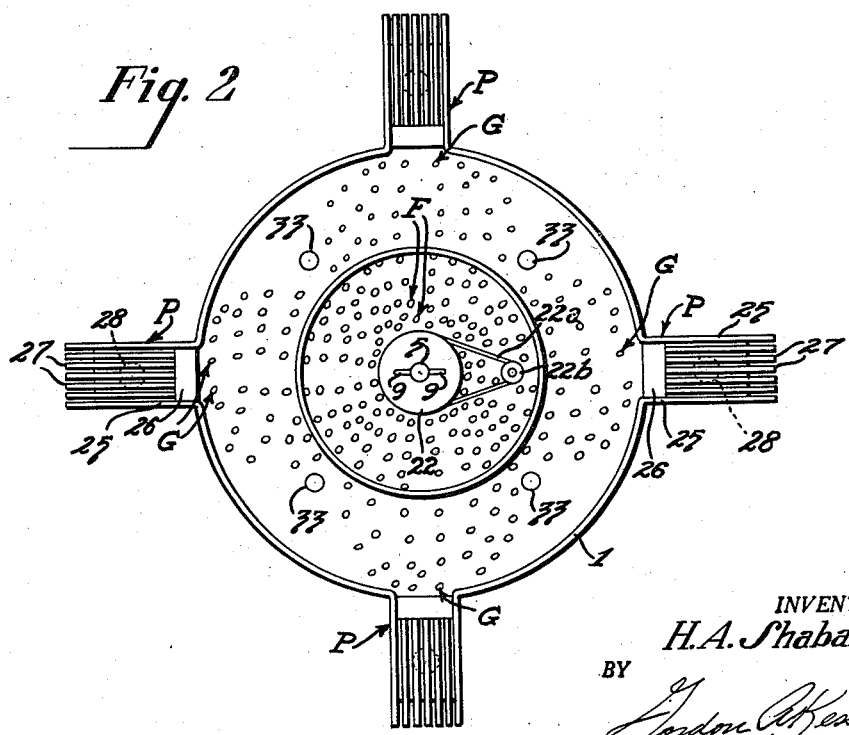
Fig. 2 is a plan view of the apparatus shown in Fig. 1.

Referring to Figs. 1 and 2, the hereinbefore described tank 1 is shown as comprising a plurality of discharge ports P which may be of any suitable construction, each of these ports defining a station where, as hereinafter described, the floating pieces of gel G are separated from the upper surface of the liquid L. Each port P may comprise an inclined channel formed by side walls 25 constituting extensions of the casing 1. The bottom of each channel is defined by an inner, inclined plate-like member 26 and a plurality of inclined, spaced bars or rods 27 extending outwardly therefrom, all of the members 26 being disposed at a common level. A funnel 28 is disposed beneath each set of bars 27 and each funnel 28, by a pipe 29, communicates with a suitably supported sump 30.

In the form of the invention herein shown, a tank 31 is disposed preferably concentrically within the tank 1, the upper edge of said tank 31 being somewhat below the outlet level of the aforesaid ports P. The inlet side of a pump 32 communicates with the sump 30 and the discharge side of this pump communicates with a series of pipes 33 which open through the bottom wall of the tank 1.

The hereinbefore described tubular support 15, Fig. 3, merges into a pipe 34 fixed at its lower end to the base structure of the tanks 1 and 21. In this manner, the device D is supported substantially at the center of the tanks 1 and 31 with the lower surfaces of the respective grooves 18a immersed to some extent in the body of liquid L. The inlet side of a pump 35 communicates with the aforesaid sump 30 and the discharge side of this pump 35, by a pipe 36, communicates with the above noted pipe 34.

The device D is intended to be representative of any suitable arrangement for supplying a suitable gel-forming solution or a sol to the disk 18 or equivalent and, in accordance with this phase of the invention, the drop-forming liquid may be an aqueous solution or a sol of a silicate or other inorganic material. More particularly, to produce a desired sol and by way of example, a solution of sodium silicate, on the one hand, or solutions of either sodium aluminate or zirconium sulphate, on the other hand, may be passed continuously to the casing 4 by way of the respective pipes 9. An ammonium sulphate solution may be admitted continuously to said casing 4 by way of the pipe 12, the solution last named being utilized to accelerate or control the setting to gel of the solutions introduced to the casing 4 by the aforesaid pipes 9.

In accordance with the invention, the specific gravity of the liquid L hereinbefore referred to should be greater and preferably only slightly greater than that of the drop-forming liquid or sol which passes from the conduit 24. At the same time, the liquid L should be immiscible with said drop-forming liquid or sol. Accordingly, for example, the liquid L may be a halogen-substituted organic liquid such as carbon tetrachloride, a phthalate such as a diethylene glycol phthalate, or a hydrocarbon liquid having proper specific gravity resulting from the vigorous thermal cracking of petroleum.

During operation of the system herein illustrated, the pumps 32 and 35 are actuated continuously for the purposes hereinafter described. Although not necessarily required, the shaft 7 may be rotated continuously by a suitable mechanical connection, not shown, and the pulley 22 is rotated in similar manner by an endless belt 22a which engages a driving pulley 22b, Fig. 2, the latter being operated by a suitable mechanism, not shown. Solutions such, for example, as hereinbefore described are admitted continuously to the casing 4 by way of the respective pipes 9, 4 and, by the rotating plates 8, the materials thus introduced through the pipes 9 are thoroughly mixed and agitated. Thereafter, the mixed materials pass continuously through the pipe 13, tube 14 and conduit 24.

Responsive to rotation of the pulley 22, the conduit 24 moves at uniform speed along a circular path above the disk 18 and, in so doing, deposits in the respective grooves 18a of the disk 18 substantially equal portions of the gel-forming liquid or sol issuing from the conduit 24. The liquid thus deposited flows downwardly in each groove and, while remaining in the groove, by reason of the fact that the lower end of the groove is below the surface of the liquid L, coalesces as a drop of gel-forming liquid resting on the upper surface of the liquid L. The direction of rotation of the pulley 22 is such that the hereinbefore described nozzle 21 follows the conduit 24 during movement thereof as described above. Under the influence of the pump 35, a stream of the supporting liquid L is caused to flow upwardly from the sump 30 by way of the pipes 36, 34, the tubular support 15 and thence by way of the passage 20b, Fig. 3, to and from said nozzle 21. As a result, each of the grooves 18a of the disk 18 receives a small part of the supporting liquid L, this liquid flowing downwardly in each groove and moving each coalesced drop of gel-forming liquid from its groove and then beyond the periphery of the disk 18. In addition, by this action, the surface defining each groove receives a film of the supporting liquid to thereby prevent chance build-up of gel in the grooves.

As stated above, the coalesced drops F of gel-forming liquid are moved beyond the periphery of the disk 1 by action of the portions of the liquid L which enter the respective grooves 18a from the nozzle 21. Even though the supporting liquid L in the tank 31 and immediately thereabove is substantially static, the action described above is sufficient to cause movement of the drops of gel-forming liquid toward and slightly beyond the periphery of said tank 31. In accordance with the invention, the pump 32 operates continuously to move streams of the supporting liquid L upwardly through the respective pipes 33 and these streams, beyond the periphery of the tank 31, cause outward movement of the upper surface of the supporting liquid L in the tank 1 toward the ports P whereby the floating drops of gel G pass downwardly through the respective ports and then into suitable receptacles as shown in Fig. 1. As will be understood, the overflowing liquid at the ports P passes into the respective funnels 28 and returns to the sump 30 by way of the respective pipes 29.

The concentrations and relative proportions of the solutions introduced through the respective pipes 9 and 12 are so selected and the total rate of feed so adjusted as to give a setting time such that drops of gel-forming liquid passing from the casing 4 do not set to gel prior to the time that they are moved beyond the periphery of the disk 18. However, the gel-setting conditions should be so selected that the drops F of gel-forming liquid supported by the upper surface of the liquid to set to pieces of gel G prior to the time that they arrive at the discharge ports P.

Increase of the total rate of feed effects a decrease in the time interval between mixture of the solutions in the casing 4 and movement of the pieces of gel to the positions last described. The setting time of the gel may be controlled, as known in the art, by adjustment of the temperature and concentration of the solutions entering the casing 4 and by change in concentration or quantity of other materials such as acids which are utilizable for adjusting the pH of the final solution.

The size of the drops of gel-forming liquid is controlled by the total rate of feed of gel-forming liquid through the conduit 24 and by the rate of rotation of the pulley 22. Thus, increase in the rate of feed through the conduit 24 increases the size of the drops of gel-forming liquid and increase in the speed of rotation of the pulley 22 decreases the size of said drops.

Although the preceding description relates to the passage of drops of gel-forming liquid into supporting relation with the liquid L for the purpose stated, it shall be understood that the invention is not to be thus limited. Thus, for example, as illustrated in U. S. Letters Patent 2,384,455, and 2,384,946, arrangements may be provided for engaging one or more streams of colloidal solution or gel-forming liquid with a liquid which, in accordance with my invention, may be the supporting liquid L herein described as having specific gravity greater than that of the aforesaid colloidal solution or gel-forming liquid. Streams of this character, after engagement with the supporting liquid L break up into drops of gel-forming liquid having substantially equal size and which, while floating on the liquid L, set to gel prior to passage thereof to the ports P herein described.

In connection with the foregoing, it is to be noted that when drops of gel-forming liquid float on the upper surface of the supporting liquid L and, while so floating, set as a gel, the gel pieces so produced, rather than being truly spherical, may be oblate spheroids. This modification in the physical form of the pieces results in substantial improvements in properties. When the gel pieces so produced are dried and employed as catalysts, the improvement, resulting from the increase in apparent surface with respect to catalyst volume in cyclic processes such as catalytic cracking wherein operation is alternately on stream for the conversion of hydrocarbons and in regeneration for the burning of coke-like deposit from the catalyst, being apparent in both stages of the cycle.

Preferably, the gel pieces of the invention are beads of inorganic gels, such as beads of metallic oxide or hydroxide hydrogels. This invention is of special importance in the production of silicious gels such as silica gel which may contain one or more other oxides or hydroxides, such as alumina, zirconia, beryllia, thoria, titania, urania, vanadia, chromia, magnesium oxide, manganese oxide, lithium oxide, and the like. Furthermore, the silicious gel so produced may contain other insoluble components such as zirconium phosphate. The fluid from which the beads are made may likewise contain finely divided powder of a size less than about 50 microns, for improvement in the drying characteristics of the gel, particularly for the prevention of breakage during drying of the hydrogel to the dried gel state, as shown in copending application of Thomas H. Milliken, Ser. No. 529,594, filed April 5, 1944, now Patent No. 2,487,065. The disclosed inorganic gels are of particular importance in hydrocarbon conversion processes, such as in the cracking of higher boiling hydrocarbons to gasoline, in the treating of gasoline for improvement of octane and reduction in acid heat, and in the polymerization, alkylation, and isomerization of hydrocarbon gases.

In order to prepare the pieces of hydrogel, formed in accordance with the above described process, for use as catalyst in hydrocarbon conversion processes, soluble impurities are first removed from the gel by washing with water or with an aqueous solution of an acid or acidic or other salt, for example, such as ammonium chloride or ammonium sulphate. In the case of silicious gels formed from sodium silicate solutions, this described purification removes the sodium from the gel. The discrete pieces of gel are then dried. If desired, the dried gel may be calcined in accordance with the processes described in the copending application of John R. Bates, Ser. No. 447,232, filed June 16, 1942 now Patent No. 2,375,-757 or of my copending application Ser. No. 538,-711, filed June 3, 1944 now abandoned.

With respect to the invention as hereinbefore described, the liquid L merely supports the drops of gel-forming liquid while they set to gel. However, in accordance with the invention, the supporting liquid L may be maintained under conditions which impose the entire setting action on the gel-forming liquid. To this end, the supporting liquid may be maintained at suitable elevated temperature or it be maintained suitably acidic so as to cause setting to gel of gel-forming liquid which would not otherwise thus set. Or, for example, the drop-forming liquid may be a mixture of a soluble silicate and sodium aluminate in aqueous menstrum at a sufficiently high pH that it will not set as a gel. If so, the supporting liquid L may be an oil solution of sulphuric or acetic acid having suitable specific gravity which functions as the sole agent as regards the desired setting action.

Again, the supporting liquid L may be maintained under conditions which merely accelerate the setting action of a gel-forming liquid having a normal setting tendency as imposed, for example, by the character of the material introduced into the casing 4 by way of the pipe 12. In this connection, in the manufacture of silicious gels, such as silica-alumina coprecipitated gels, the drop-forming liquid may be either an acidic or a basic sol of silica and alumina, and the supporting liquid L basic or acidic respectively whereby the setting time of the sol is considerably reduced. Likewise, the supporting liquid L may be maintained at an elevated temperature in order to accelerate setting of the sol.

As regards those aspects of the invention last described, then, the liquid which receives the sol is maintained under conditions such that it contributes, either entirely or partly, to the desired setting action. It shall be understood that the specific gravity of this liquid may be such that it either supports the gel-forming pieces in floating relation or suspends them while they move either upwardly or downwardly therethrough.

Obviously many modifications and variations of the invention as hereinbefore set forth may be made without departing from the spirit and scope thereof and therefore only such limitations should be imposed as are indicated in the appended claim.

The method of producing pieces of hydrogel, which comprises passing gel-forming liquids to a zone where they are mixed with each other, passing the resulting gel-forming liquid mixture downwardly at least partly under the influence of gravity until it engages and in drop formation floats on the upper surface of a supporting liquid which has higher specific gravity than said gel-forming liquid mixture and is immiscible therewith, maintaining said gel-forming liquid mixture continuously in drop formation and in floating relation on said upper surface of the supporting liquid while setting to pieces of hydrogel, and causing the pieces of hydrogel, while still floating on said upper surface of the supporting liquid, to move to a station where they are separated therefrom.

HUBERT A. SHABAKER.

REFERENCES CITED

The following references are of record in the file of this patent:

UNITED STATES PATENTS

| Number | Name | Date |
|---|---|---|
| 1,900,190 | Menzies | Mar. 7, 1933 |
| 2,299,929 | Raynolds | Oct. 27, 1942 |
| 2,311,389 | Hawks et al. | Feb. 16, 1943 |
| 2,320,335 | Sauer | June 1, 1943 |
| 2,384,455 | Daley | Sept. 11, 1945 |
| 2,384,946 | Marisic | Sept. 18, 1945 |
| 2,385,217 | Marisic | Sept. 18, 1945 |